United States Patent
Strenge (10) Patent No.: US 8,827,030 B1
(45) Date of Patent: Sep. 9, 2014

(54) GEARBOX

(75) Inventor: Gerd Strenge, Wuppertal (DE)

(73) Assignee: Arrma Durango Ltd, Ashby-de-la-Zouch (GB)

( * ) Notice: Subject to any disclaimer, the term of this patent is extended or adjusted under 35 U.S.C. 154(b) by 0 days.

(21) Appl. No.: 14/232,861

(22) PCT Filed: Jul. 11, 2012

(86) PCT No.: PCT/GB2012/051639
§ 371 (c)(1),
(2), (4) Date: May 19, 2014

(87) PCT Pub. No.: WO2013/011278
PCT Pub. Date: Jan. 24, 2013

(30) Foreign Application Priority Data

Jul. 15, 2011 (GB) .................................. 1112236.3

(51) Int. Cl.
- *B60K 17/00* (2006.01)
- *F16H 57/02* (2012.01)
- *A63H 29/00* (2006.01)
- *A63H 17/26* (2006.01)
- *F16H 1/22* (2006.01)

(52) U.S. Cl.
CPC . *F16H 1/22* (2013.01); *A63H 17/26* (2013.01)
USPC ............. 180/374; 74/404; 180/344; 180/364; 446/443

(58) Field of Classification Search
USPC ............ 74/404; 180/344, 364, 369, 374, 376, 180/377, 379, 383; 446/443; 475/198, 204, 475/298
See application file for complete search history.

(56) References Cited

U.S. PATENT DOCUMENTS

| | | | | |
|---|---|---|---|---|
| 3,659,378 | A * | 5/1972 | Tong | 446/90 |
| 4,059,918 | A * | 11/1977 | Matsushiro | 446/443 |
| 4,516,648 | A * | 5/1985 | Berger et al. | 180/6.66 |
| 4,878,877 | A | 11/1989 | Auer et al. | |
| 5,273,480 | A * | 12/1993 | Suto | 446/456 |
| 5,304,088 | A * | 4/1994 | Suimon | 446/443 |
| 5,374,213 | A * | 12/1994 | Brovelli | 446/463 |
| 6,505,527 | B2 * | 1/2003 | Lu | 74/332 |
| 6,694,835 | B2 * | 2/2004 | Kawahara | 74/355 |

(Continued)

FOREIGN PATENT DOCUMENTS

| CN | 201632059 U | 11/2010 |
|---|---|---|
| EP | 1286081 A1 | 2/2003 |
| GB | 951951 A | 3/1964 |

*Primary Examiner* — Paul N Dickson
*Assistant Examiner* — Laura Freedman
(74) *Attorney, Agent, or Firm* — Drinker Biddle & Reath LLP (57) ABSTRACT

A gearbox for a model car, comprising: a housing; an input gear; an output gear; and at least one intermediate gear. The housing provides a support for each of the input gear, the output gear and each intermediate gear; and in which the gearbox has: a first operating configuration where the input gear, the output gear and at least one intermediate gear are supported by the supports and mesh to form a gear train from input gear to output gear through each intermediate gear supported by the supports; and a second operating configuration where the input gear and the output gear are supported on the supports but fewer intermediate gears are supported by the supports, such that the input gear, the output gear and any intermediate gears supported by the supports mesh to form a gear train from input gear to output gear through any remaining intermediate gears.

12 Claims, 12 Drawing Sheets

(56) References Cited

U.S. PATENT DOCUMENTS

| | | | |
|---|---|---|---|
| 7,390,280 B2 * | 6/2008 | Duitsman et al. | 475/306 |
| 7,815,542 B2 * | 10/2010 | Dec | 475/326 |
| 2006/0270505 A1 | 11/2006 | Duitsman et al. | |
| 2010/0216586 A1 * | 8/2010 | Gleasman | 475/198 |

* cited by examiner

GEARBOX

CROSS-REFERENCE TO RELATED APPLICATIONS

This application is the U.S. national phase of the International Patent Application No. PCT/GB2012/051639 filed Jul. 11, 2012, which claims the benefit of United Kingdom Application No. 1112236.3 filed Jul. 15, 2011, the entire content of which is incorporated herein by reference.

FIELD

This invention relates to a gearbox for a model car, a drive mechanism using such a gearbox, and to a model car, typically a two wheel drive model car.

BACKGROUND

Model cars are well known in the prior art. Typically, a two wheel drive (2WD) model car will comprise a motor (typically electric) which drive a set of driven wheels (typically two, at the rear of the car) through a gearbox. The gearbox may be inverting (in that it switches the sense of rotation from the motor from clockwise to anti-clockwise or vice versa) or non-inverting (in that it preserves the sense of the rotation of the motor).

Users of model cars, particularly enthusiasts who wish to customise their model cars, will often desire to change the weight distribution of their model car. One way to do this is to move the motor between a mid motor position (in which the motor is provided immediately forward of the axle driving the driven rear wheels) and a rear motor position (in which the motor is provided immediately behind the axle driving the driven rear wheels).

Such users also often wish to change the feel of their model car by changing whether the motor rotates in the same rotational direction as the driven wheels for forward motion or the opposite direction. This can change the torque, acceleration and grip feel of the car.

However, both of these changes have to date generally required a change of gearbox housing, in particular where it is necessary to change the sense of motion of the output of the gearbox relative to the motor. In turn, this often requires other changes to the car, such as changes to the suspension. This is inconvenient to the user, and requires manufacture of more parts than is necessary.

SUMMARY

According to a first aspect of the invention, there is provided a gearbox for a model car, comprising:
  a housing;
  an input gear;
  an output gear; and
  at least one intermediate gear;
  in which the housing provides a support for each of the input gear, the output gear and each intermediate gear; and in which the gearbox has:
  a first operating configuration where the input gear, the output gear and at least one intermediate gear are supported by the supports and mesh to form a gear train from input gear to output gear through each intermediate gear supported by the supports; and
  a second operating configuration where the input gear and the output gear are supported on the supports but fewer intermediate gears are supported by the supports, such that the input gear, the output gear and any intermediate gears supported by the supports mesh to form a gear train from input gear to output gear through any remaining intermediate gears.

Thus, a gearbox is provided that can have different configurations and hence numbers of gears, without having to provide a different gearbox housing. The different configurations could, for example, provide that the gearbox provide rotation at the output gear of opposing senses for the same rotation at the input gear in the first and second operating configurations.

Typically, the difference in the number of intermediate gears supported on the supports in the first and second operating configurations will be an odd number, such that the first and second orientations provide rotation at the output gear of opposing senses for the same rotation at the input gear in the first and second operating configurations. In the simplest and preferred embodiment the difference will comprise a single gear. This enables a single gear to be removed, with the input, output and any remaining intermediate gears still meshed, to provide a gearbox of the opposite sense. As such, a single gearbox housing can simply operate either to reverse, or not reverse the sense of the rotation of the input gear at the output gear.

Whilst there may be no intermediate gears supported on the supports in the second operating position, typically there will be at least one; in the preferred embodiment there are two intermediate gears supported by the supports in the first operating configuration and one intermediate gear supported by the supports in the second operating configuration.

Typically, a set of intermediate gears supported by the supports in the first operating configuration may be disjoint from a set of intermediate gears supported by the supports in the second operating position. Alternatively, the set of intermediate gears supported by the supports in the second operating position may be a subset of the set of intermediate gears supported by the supports in the first operating position. In a further alternative, there may be some, but not total overlap between these two sets.

Each intermediate gear may comprise an idler gear (that is, a gear that is not driving any shaft). Typically, any or all of each intermediate gear, the input gear and the output gear could be a spur gear, a helical gear or any other suitable gear.

The support for at least one intermediate gear may be arranged to support an intermediate gear in a different position within the housing in the first operating configuration and the second operating configuration. Accordingly, an intermediate gear can be supported in an appropriate position to form part of the gear train in both the first and second operating configurations. For example, the support may comprise a peg, with the housing having two apertures in different positions, the peg fitting in both apertures. One aperture would represent the appropriate position for an intermediate gear in the first operating configuration, and the other aperture the appropriate position for an intermediate gear (which may be the same or a different intermediate gear) in the second operating configuration.

The input gear may be provided with teeth and a clutch, such as a slipper clutch, having an input, such that torque input at the input in a given direction to the input gear will be cause the clutch to lock the input relative to the teeth, but torque applied to the output gear in a direction tending to (otherwise) rotate the input gear in the given direction will cause the clutch to slip and allow relative rotational movement of the input and the teeth.

The output gear may be provided with a differential having two outputs, the differential allowing the two outputs to rotate relative to each other but still be driven by rotation of the output gear. Typically, the differential will be arranged such that the mean of the rotational speed at which the outputs are driven is proportional to the rotational speed of the output gear.

According to a second aspect of the invention, there is provided a drive mechanism for a model car, comprising a motor having an output shaft and a gearbox according to the first aspect of the invention, in which the output shaft of the motor is coupled to the input gear of the gearbox.

Typically, the drive mechanism may comprise at least one output for coupling to a driving axle of the model car. Where the gearbox comprises a differential, each output may be an output of the differential.

The output shaft of the motor may be directly coupled to the input gear, such that the input gear rotates with the output shaft. However, in the preferred embodiment the output shaft will be connected to the input gear by means of a geared connection. Where a clutch is provided, the connection of the output shaft to the input gear may be to the input of the clutch.

According to a third aspect of the invention, there is provided a model car, comprising the drive mechanism of the second aspect of the invention and at least one driven wheel, each driven wheel having and being driven by a driving axle coupled to an output of the drive mechanism.

Typically, the car will also comprise at least one non-driven wheel. Typically, there will be two driven wheels and two non-driven wheels; thus, the car may be a two wheel drive (2WD) car. The non-driven wheels may be steerable wheels defining a front end of the car, and the driven wheels may be non-steerable and may define the rear end of the car. The terms "forwards" and "backwards" can then be interpreted as towards the front end and towards the rear end of the car respectively, and "lateral" as relating to the sides of the car joining the front and back ends.

The drive mechanism may be provided such that the motor can be mounted on the car in a mid-motor position, where the motor is forward of the driven axles, and in a rear-motor position, where the motor is backward of the driven axles. Thus, the same drive mechanism can be installed in two commonly desirable positions; typically, the only change that may be necessary to the drive mechanism is the change of the configurations between the first and second operating configurations.

Additionally, the drive mechanism may be provided such that the motor can be mounted in the car with the output shaft extending towards either lateral side of the car. Thus, the motor can be installed with the output shaft towards the right or left hand side of the car; typically, for the motor in the same position but with the output shaft extending in opposite directions, a change of sense of the gearbox will be required; as such, the gearbox may be employed in one operating configuration with the output shaft facing in one direction and the other operating configuration in the other.

Typically, the drive mechanism can therefore be installed in four positions in the car: rear motor, output shaft on left hand side; rear motor, output shaft on right hand side; mid motor, output shaft on right hand side; mid motor, output shaft on left hand side. These positions are achievable without replacing the gearbox housing; typically all that may be needed is the changing of the gearbox housing between the first and second operating configurations.

According to fourth aspect of the invention, there is provided a method of configuring a gearbox according to the first aspect of the invention, comprising changing the gearbox between the first and second operating configurations by at least one of adding and removing intermediate gears.

The method may also comprise moving at least one support for an intermediate gear within the housing, so that the gear train meshes. This step may comprise moving the support for each intermediate gear supported by the supports in the second operating configuration.

BRIEF DESCRIPTION OF THE DRAWINGS

There now follows, by way of example only, an embodiment of the present invention described with reference to, and as illustrated in, the accompanying drawings, in which.

DETAILED DESCRIPTION

A gearbox according to an embodiment of the invention is shown in FIGS. 1 to 4 of the accompanying drawings. The gearbox 1 comprises a housing 2, in which are supported, in a first operating configuration shown in FIGS. 1 and 3 of the accompanying drawings, four gears 3, 4, 5, 6. Gear 3 is an input gear, and gear 6 an output gear. Gears 4 and 5 are intermediate gears, which mesh sequentially to form a gear train from input gear 3 to output gear 6. Given that there are an even number (four) of gears in the gear train, when the input gear 3 is rotated the output gear 6 will rotate in the opposite direction.

Figure 1:
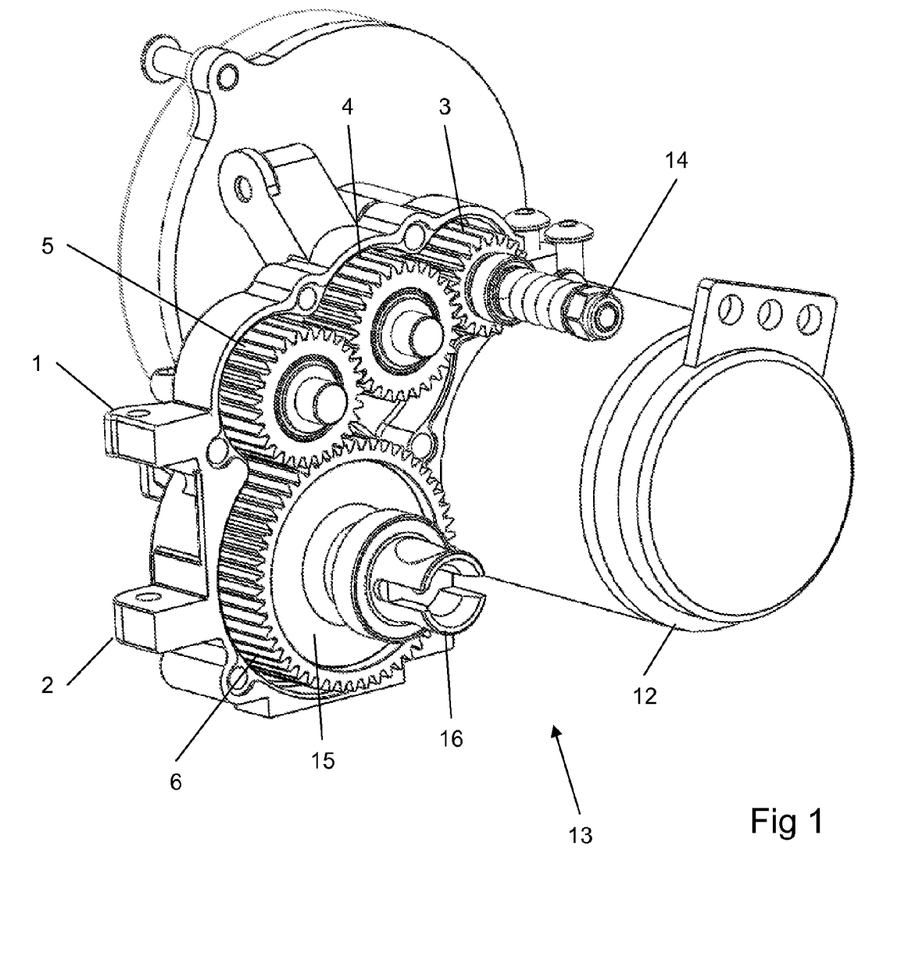
FIG. 1 shows a perspective view of a gearbox in accordance with an embodiment of the invention, in a first operating configuration.
Figure 2:
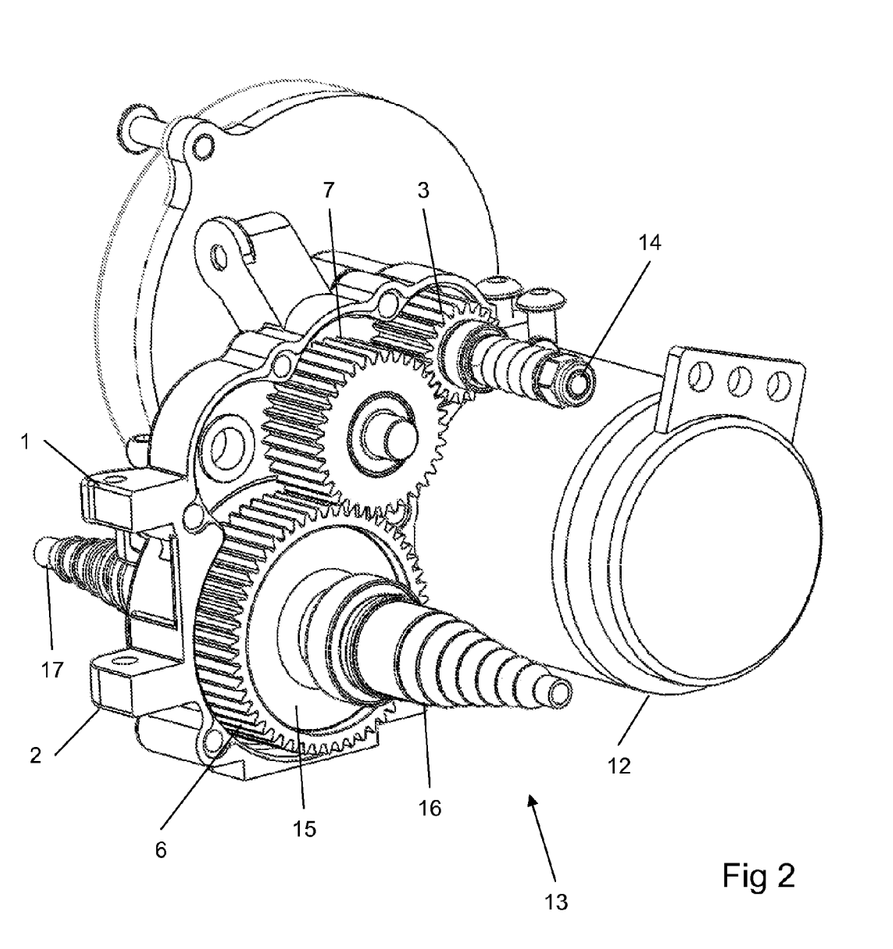
FIG. 2 shows a perspective view of the gearbox of FIG. 1, in a second operating configuration.
Figure 3:
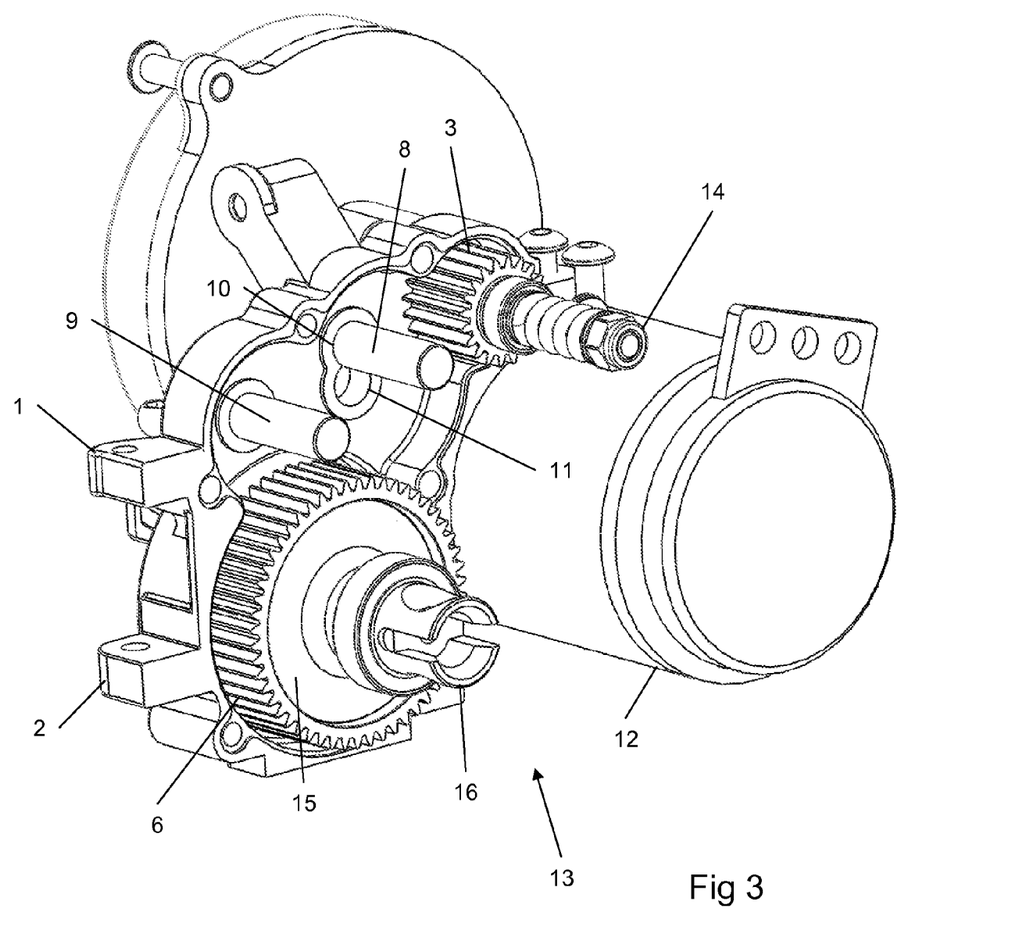
FIG. 3 shows a perspective view of the gearbox of FIG. 1 in the first operating configuration, with two gears removed.

In the first operating configuration shown in FIGS. 1 and 3 of the accompanying drawings, there are four gears in the gear train. In a second operating configuration shown in FIGS. 2 and 4 of the accompanying drawings, the same housing 2 is provided, and the same input and output gears 3, 6, but a single intermediate gear 7 replaces the two intermediate gears 4, 5. This single intermediate gear 7 meshes directly with the input 3 and output 6 gears to form a gear train from input gear 3 to output gear 6. Given that there are now an odd number of gears (three) in the gear train, the output gear 6 will rotate in the same direction to that in which the input gear is rotated.

Figure 4:
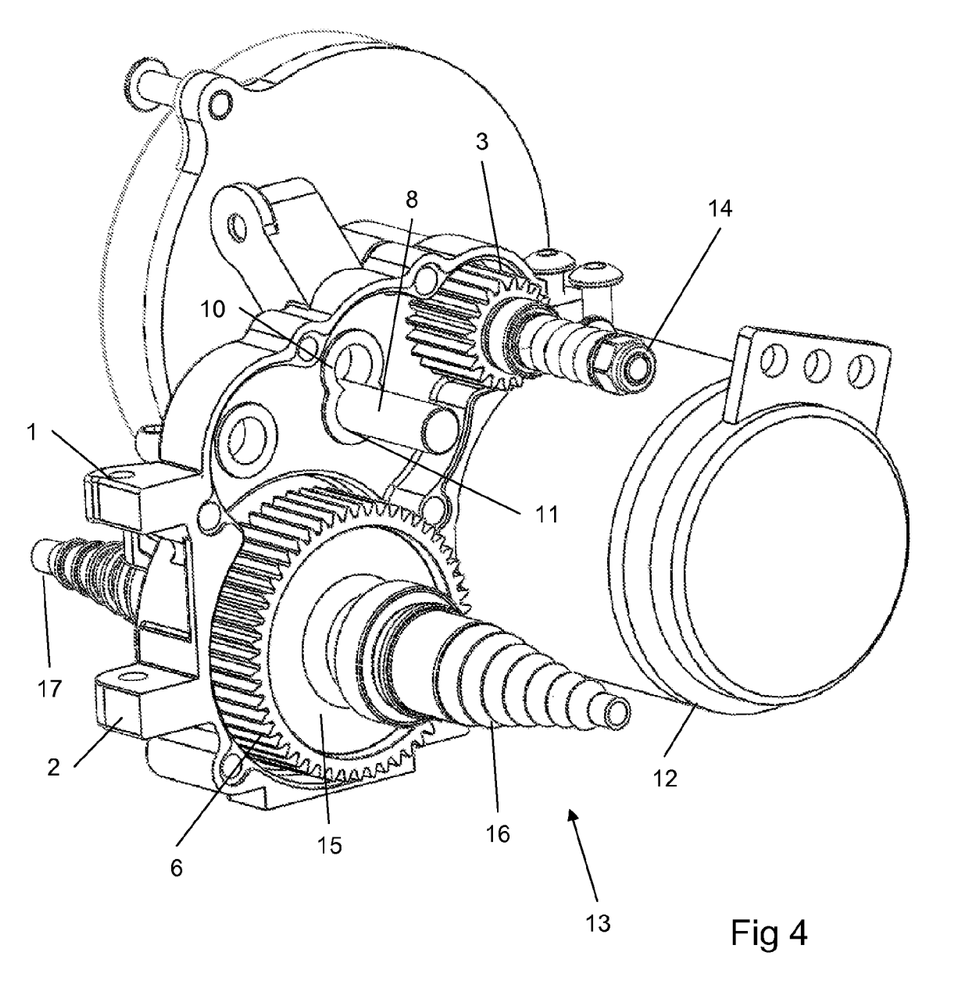
FIG. 4 shows a perspective view of the gearbox of FIG. 1 in the second operating configuration, with a gear removed.

In order to achieve this, supports are provided for the intermediate gears 4, 5, 7 as shown in FIGS. 3 and 4 of the accompanying drawings. A common support 8 is provided for intermediate gears 4 and 7, whilst intermediate gear 5 has a separate support 9. Both of the supports 8, 9 are formed as pegs supported by the housing 2. The support 9 for the intermediate gear 5 is fixed relative to the housing, as intermediate gear 5 is only installed in a single position.

However, to allow for the differing positions in which the intermediate gears 4 and 7 need to be installed, the support 8 can be fitted into the housing in two positions (as shown in FIGS. 3 and 4 respectively. The housing is provided with two overlapping apertures 10, 11 having the same outline as the (circular) cross section of the support 8 (with a small difference in size to allow for an interference fit). When the support 8 is fitted into the topmost aperture 10, the intermediate gear 4 can be placed thereupon in order to use the gearbox 1 in the first operating configuration, whereas when the support 9 is fitted into the lower aperture 11, the intermediate gear 7 can be placed thereupon in order to use the gearbox 1 in the second operating configuration.

Thus, to change the gearbox from the first to the second operating configuration, the intermediate gears 4 and 5 are removed, the support 8 is moved into the lower aperture 11 and the intermediate gear 7 placed upon support 8 and support 9 is removed. In order to change the gearbox from the second to the first operating configuration, the intermediate gear 7 is removed, the support 8 is moved into the topmost aperture 10 and the intermediate gears 4 and 5 placed upon supports 8 and 9 respectively. This is a relatively simple operation which can be carried out by an end user.

Together with the gearbox 1, there is provided a motor 12, in order to provide a drive mechanism 13. The motor 12 has an output shaft (not shown in the drawings, but on the opposite face of the motor 12 to that facing the viewer in FIGS. 1 to 4). On this output shaft is provided a pinion gear (not shown), which engages a large spur gear (not shown) coaxial with the input gear 4. This spur gear is mounted on a layshaft 14 which connects via slipper clutch to input gear 3. The slipper clutch (not shown) allows torque in the direction in which the motor rotates the input gear to pass from the motor to the input gear 3 and not vice versa (torque being applied from the input gear to the motor will cause the slipper clutch to slip).

The output gear 6 houses a differential 15 with two rotational outputs 16, 17 on opposing sides thereof. The differential 15 allows the rotational outputs to rotate relative to one another (for example, when a car installed with the drive mechanism is cornering) whilst still driving the outputs. The outputs 16, 17 will be driven by the differential 15 such that the mean rotational speed of the outputs at any given time (that is, half the sum of the instantaneous rotational speeds of the outputs) is proportional to the speed at which the output gear 6 is rotating.

As such, this gearbox 1 and the drive mechanism 13 more generally are useful for driving model cars, and typically two wheel drive (2WD) model cars. Such a 2WD model car 20 can be used to demonstrate the flexibility of the gearbox 1. Taking FIGS. 5 to 8 of the accompanying drawings initially, the car 20 comprises a chassis 21 supporting two steerable but undriven wheels 22 at a front end 23 of the car 20 and two non-steerable driven wheels 24 at a rear end 25 of the car 20. Each of the driven rear wheels 24 is driven by means of an axle 26.

Figure 5:
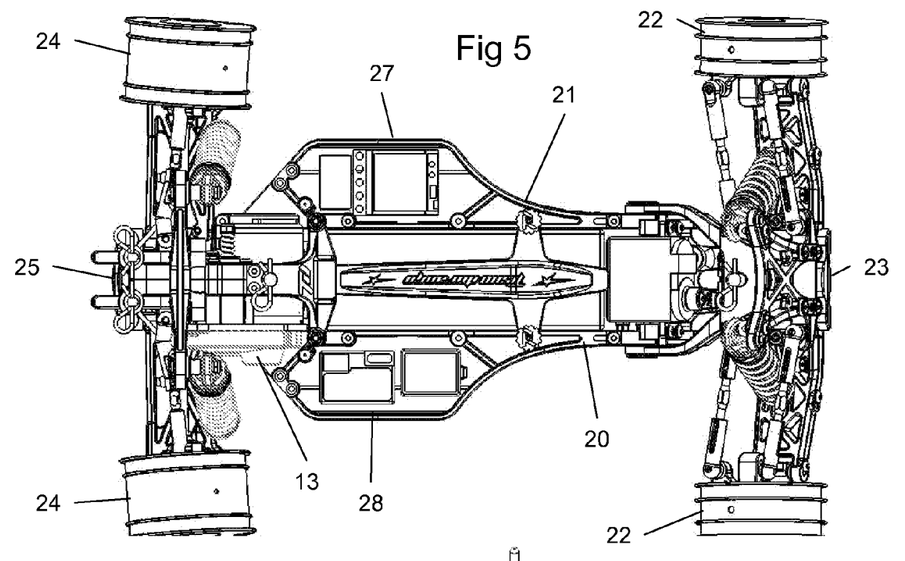
FIG. 5 shows a plan view of a car fitted with the gearbox of FIG. 1 in a mid-engined position with the motor on the left hand side of the car.
Figure 6:
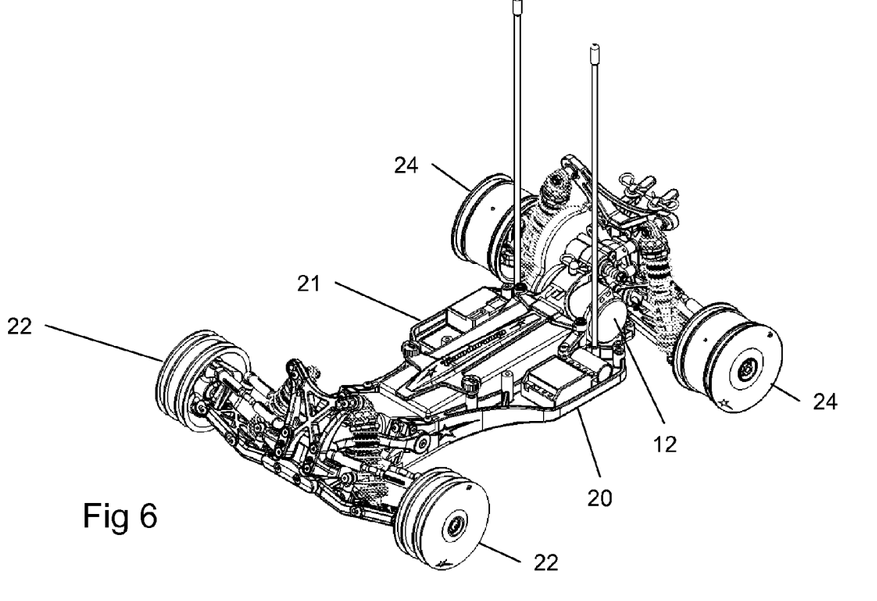
FIG. 6 shows a perspective view from the front of the car of FIG. 5.
Figure 7:
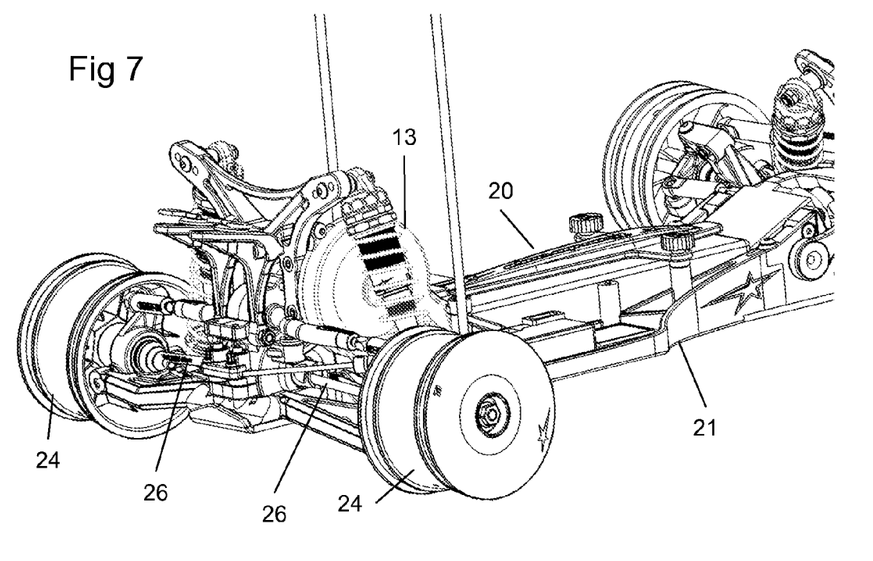
FIG. 7 shows a perspective view from the rear right hand side of the car of FIG. 5.
Figure 8:
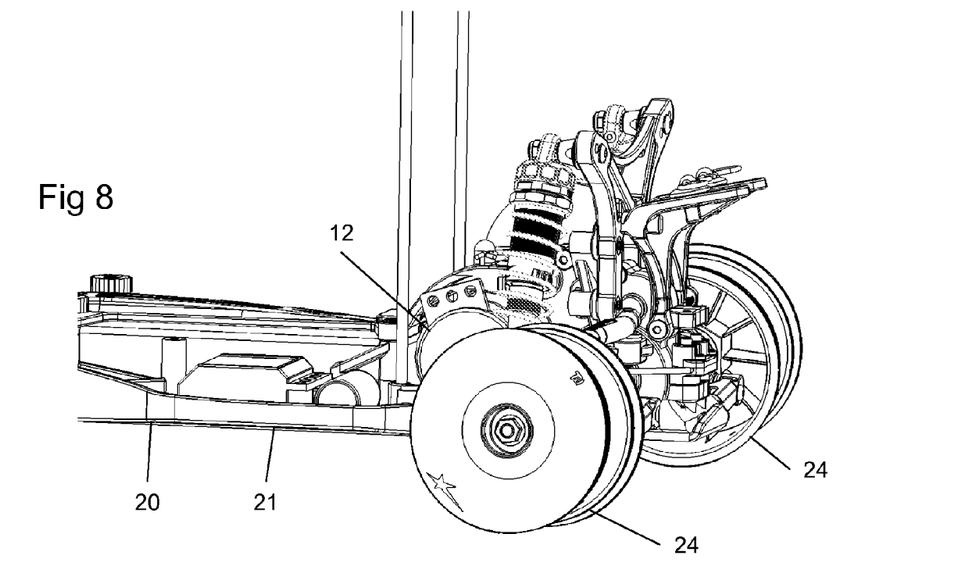
FIG. 8 shows a perspective view from the rear left hand side of the car of FIG. 5.
Figure 9:
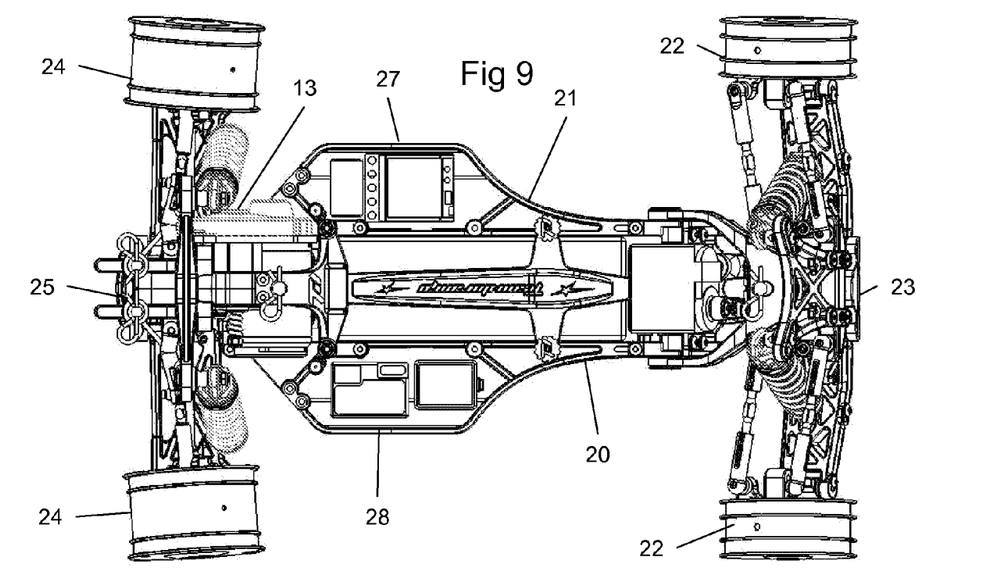
FIGS. 9 to 12 show corresponding views to FIGS. 5 to 8 respectively, with the motor in a mid-engined position with the motor on the right hand side of the car.
Figure 10:
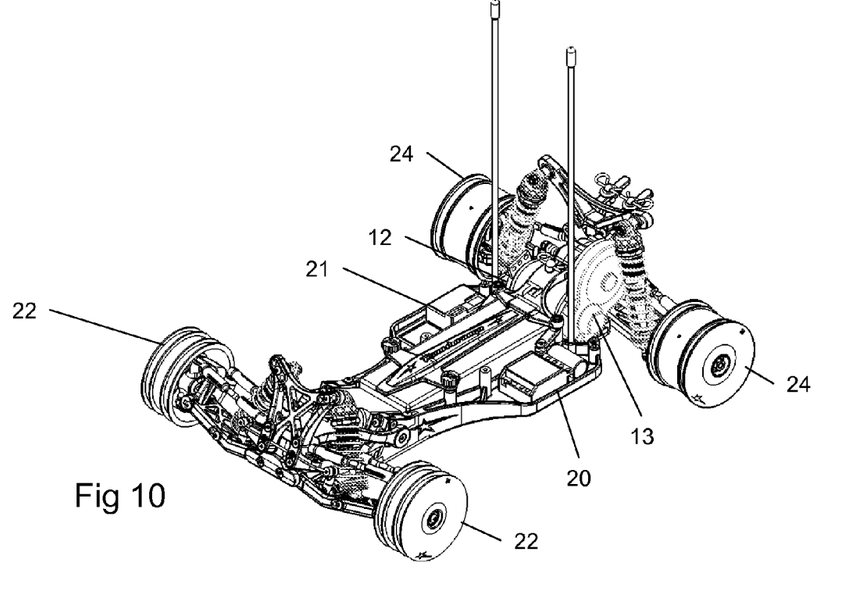
Figure 11:
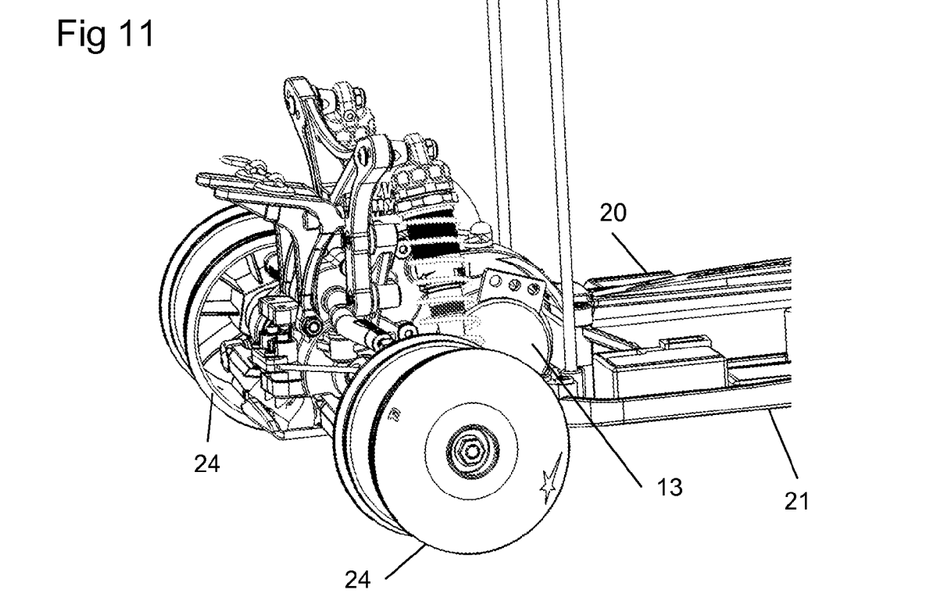
Figure 12:
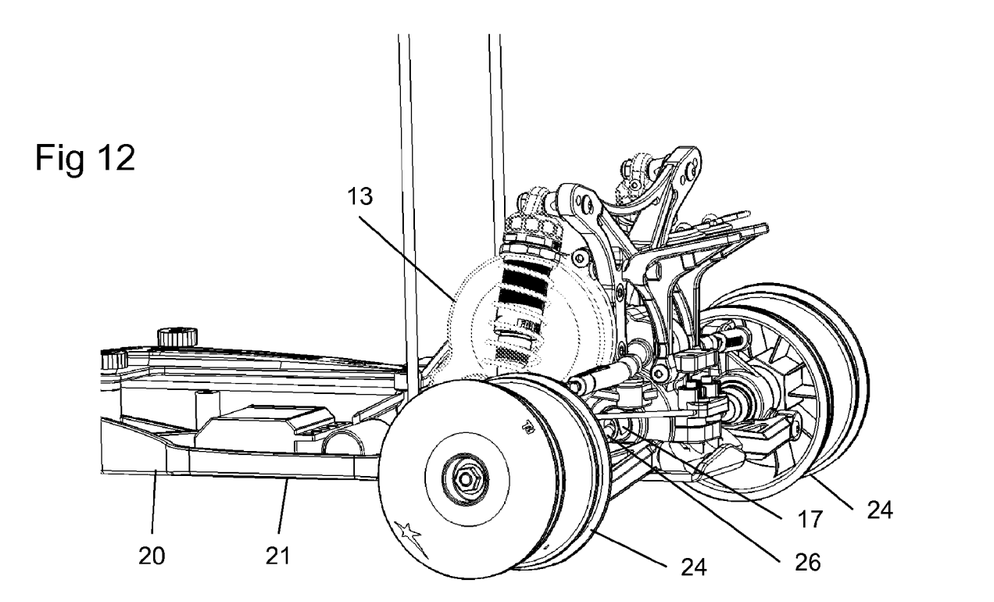
Figure 13:
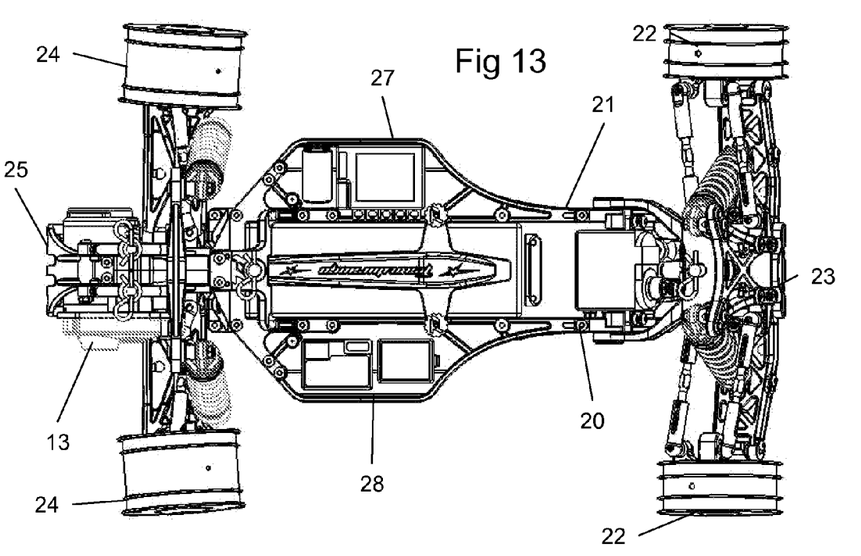
FIGS. 13 to 16 show corresponding views to FIGS. 5 to 8 respectively, with the motor in a rear-engined position with the motor on the left hand side of the car.
Figure 14:
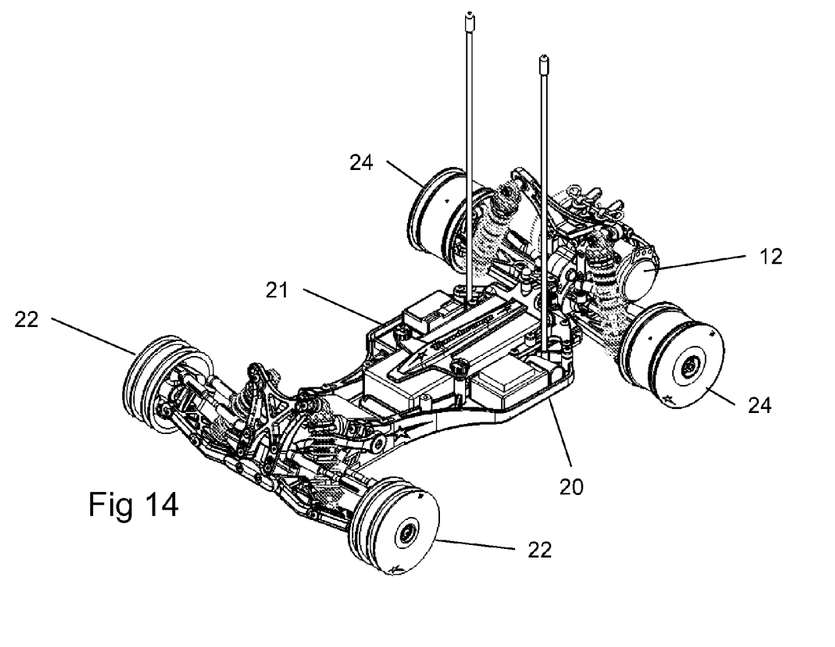
Figure 15:
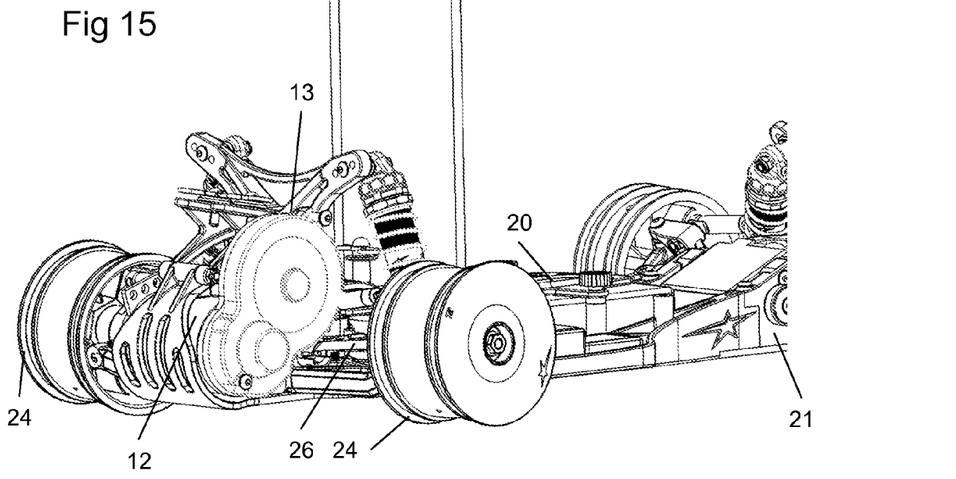
Figure 16:
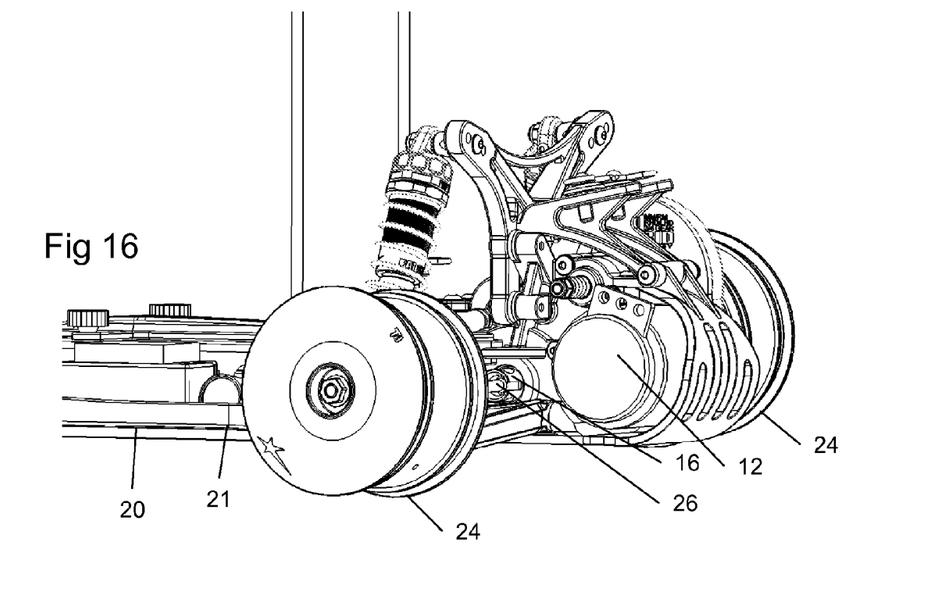
Figure 17:
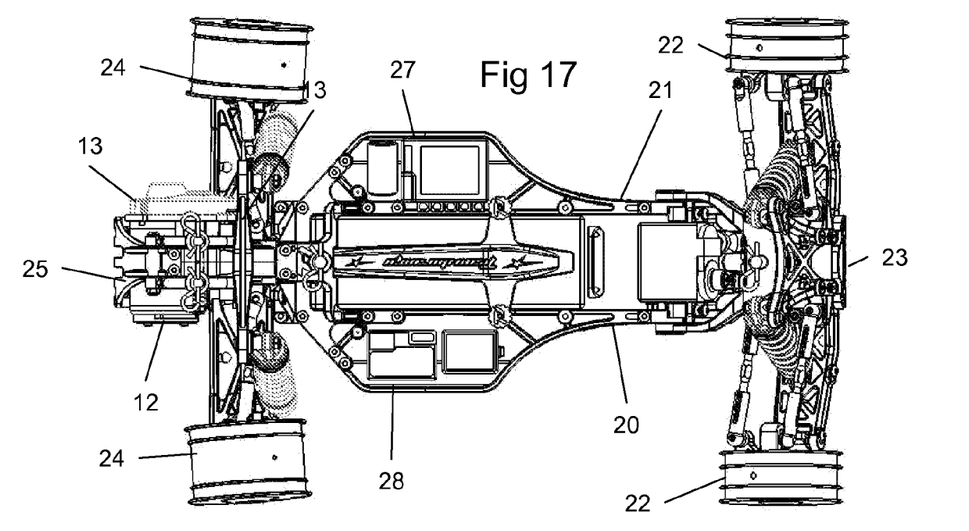
FIGS. 17 to 20 show corresponding views to FIGS. 5 to 8 respectively, with the motor in a rear-engined position with the motor on the right hand side of the car.
Figure 18:
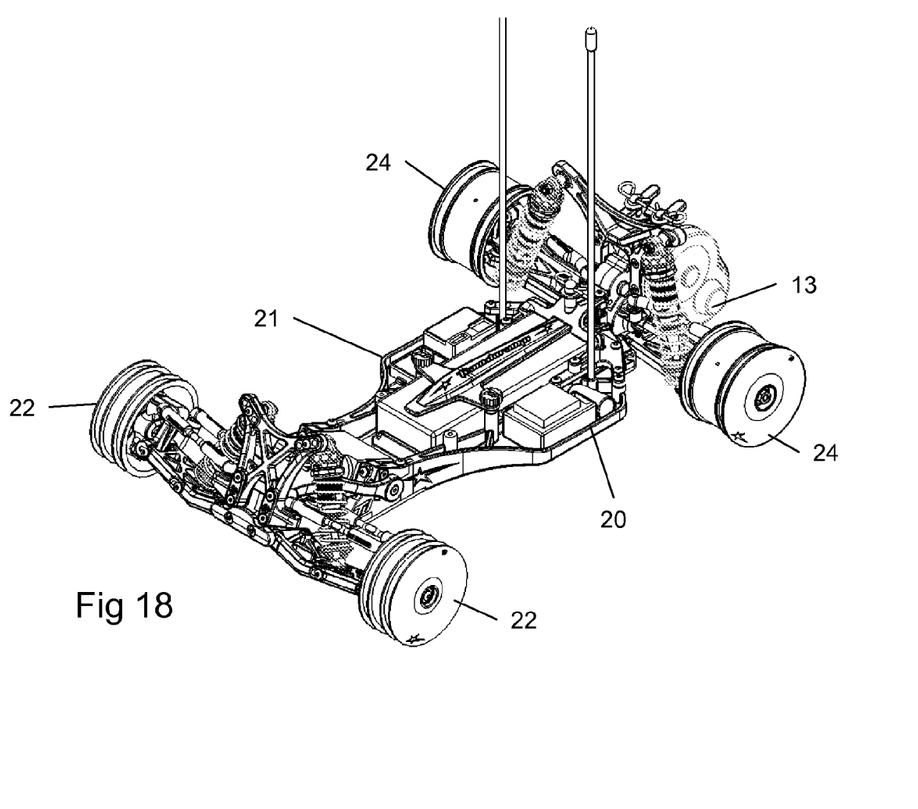
Figure 19:
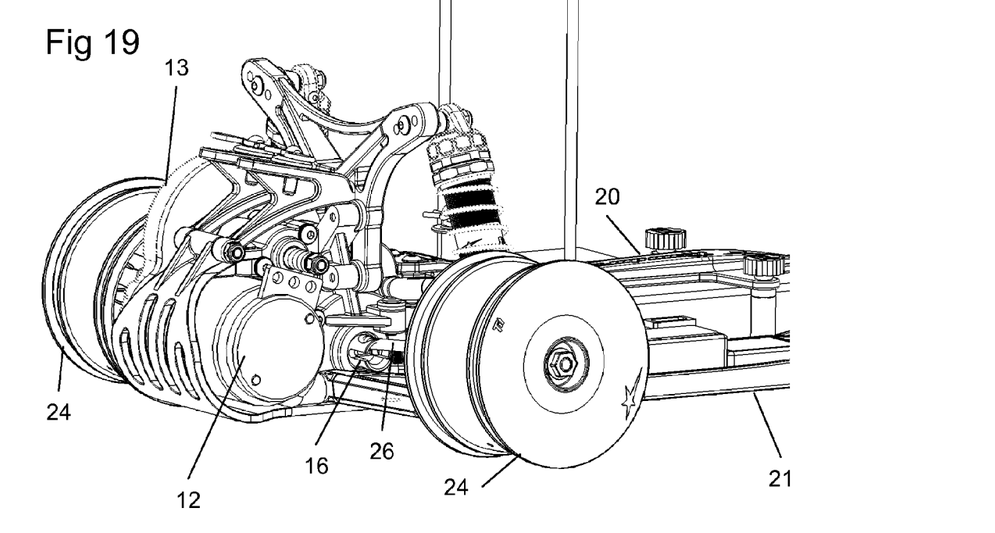
Figure 20:
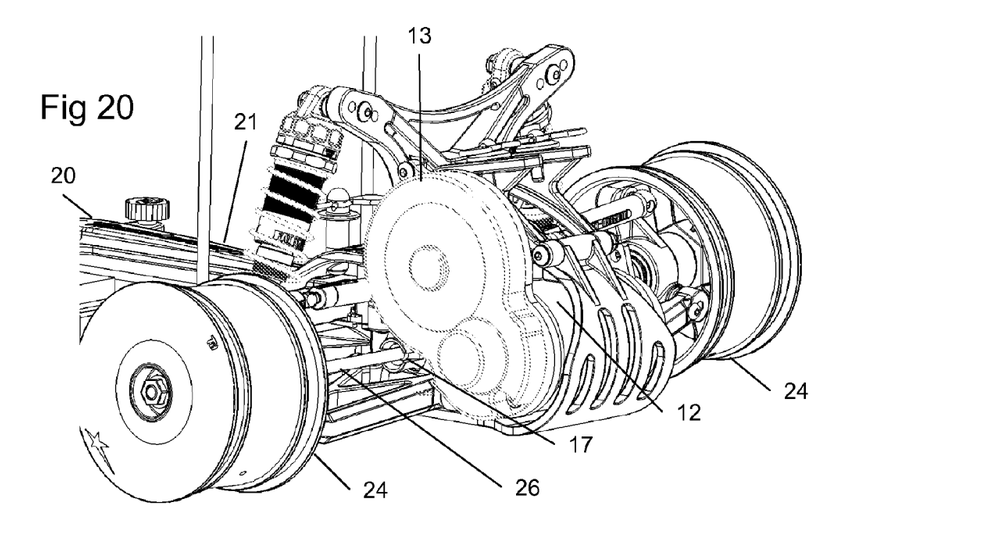

Having defined the front 23 and rear 24 ends above, the left 27 and right 28 hand lateral sides of the car 20 can be introduced based on the view from above.

The drive mechanism 13 is installed in the car 20 such that each rear axle 26 is connected to one of the outputs 16, 17. Because of the flexibility of the present gearbox, the motor can be installed in various different positions depending on how the user wishes to distribute the weight of the car 20. The motor 20 is one of the heaviest components in a model car, and the ability to position it in different positions is very desirable.

Furthermore, the gearbox 1 can be used in the first operating configuration so that the output gear 6 and hence the axles 26 will rotate in the opposite sense as the input gear 3 and so in the same sense to the output shaft of the motor (due to the pinion gear and large spur gear inverting the sense of rotation) and in the second operating configuration which will mean that the axles 26 are rotated in the opposite sense as the motor 12 output shaft. This allows the motor to be installed on either the right hand or the left hand side of the vehicle, with the output shaft facing in opposite directions, and the gearbox switched operating configurations to allow the motor to still rotate in its preferred direction whilst driving the car 20 forwards.

As such, the user can select the feel of the car between a situation where the motor is rotating in the same sense as the driven wheels or the opposite sense; the torque, acceleration and grip feel of the car is greatly affected by the rotational direction of the motor in relation to the rotation of the driven wheels.

This can be seen in the accompanying Figures. In FIGS. 5 to 8 of the accompanying drawings, the drive mechanism 13 is installed with the motor 12 immediately forward of the axles 26; this is a mid-motored position. Furthermore, the motor 12 is on the left hand side of the car 20, so that the output shaft extends towards the right hand side.

FIGS. 9 to 12 of the accompanying drawings show the equivalent position but with the motor installed on the right hand side of the car 20 and the output shaft extending out the motor towards the left hand side of the car 20; thus, the relative rotational sense of the motor 12 relative to the wheels 24 will be inverted, with the weight of the motor still in a mid-motored position in front of the axles 26. The operating configuration of the motor will be swapped with respect to the position of FIGS. 5 to 8.

FIGS. 13 to 16 of the accompanying drawings show the drive mechanism 13 installed such that the motor is behind the axles 26: this is a rear-motored position. The weight of the motor 12 is therefore much further back than in FIGS. 5 to 8 or 9 to 12, which may be desirable in some situations. The motor 12 is positioned on the left hand side, with the output shaft of the motor extending from the motor on the right hand side of the car 20.

FIGS. 17 to 20 of the accompanying drawings show the drive mechanism 13 installed in the car 20 such that the motor 12 is again behind the axles, but the motor has been swapped to the right hand side (with the output shaft extending from the motor 12 towards the left hand side of the car 20). The operating configuration of the motor will have been swapped to allow the wheels 24 to be rotated in the correct direction, with the sense of the motor relative to the wheels now being inverted with respect to the position of FIGS. 13 to 16.

As such, the gearbox 1 of the present embodiment is particularly flexible, as it allows a user to select whether or not the gearbox 1 inverts the sense of rotation of the motor 12. This is provided without having to change the gearbox housing 2; nor is it required to make any changes to any other components of the car, such as the suspension and in particular the suspension geometry.

The invention claimed is:
1. A gearbox for a model car, comprising:
a housing;
an input gear; and
an output gear;

in which the housing provides a support for each of the input gear, the output gear and at least one intermediate gear; and in which the gearbox has:
a first operating configuration where the input gear, the output gear and intermediate gears are supported by the supports and mesh to form a gear train from input gear to output gear through each intermediate gear supported by the supports; and
a second operating configuration where the input gear and the output gear are supported on the supports and fewer intermediate gears are supported by the supports with respect to the first operating configuration, such that the input gear, the output gear and the intermediate gears supported by the supports mesh to form a gear train from input gear to output gear through the intermediate gears.

2. The gearbox of claim 1, in which the difference in the number of intermediate gears supported on the supports in the first and second operating configurations will be an odd number, such that the first and second operating configurations provide rotation at the output gear of opposing senses for the same rotation at the input gear in the first and second operating configurations.

3. The gearbox of claim 1, in which the support for at least one intermediate gear is arranged to support an intermediate gear in a different position within the housing in the first operating configuration and the second operating configuration.

4. The gearbox of claim 1, in which the input gear is provided with teeth and a clutch having an input, such that torque input at the input in a given direction to the input gear will cause the clutch to lock the input relative to the teeth, and torque applied to the output gear in a direction tending to otherwise rotate the input gear in the given direction will cause the clutch to slip and allow relative rotational movement of the input and the teeth.

5. The gearbox of claim 1, in which the output gear is provided with a differential having two outputs, the differential allowing the two outputs to rotate relative to each other and still be driven by rotation of the output gear.

6. A drive mechanism for a model car, comprising a motor having an output shaft and a gearbox according to claim 1, in which the output shaft of the motor is coupled to the input gear of the gearbox.

7. The drive mechanism of claim 6, comprising at least one output for coupling to a driving axle of the model car.

8. A model car, comprising the drive mechanism of claim 6 and at least one driven wheel, each driven wheel being driven by a driving axle coupled to an output of the drive mechanism.

9. The model car of claim 8, in which the drive mechanism is provided such that the motor can be mounted on the car in a mid-motor position, where the motor is forward of the driven axles, and in a rear-motor position, where the motor is backward of the driven axles.

10. The model car of claim 8, in which the drive mechanism is provided such that the motor can be mounted in the car with the output shaft extending towards either lateral side of the car.

11. A method of configuring a gearbox according to claim 1, comprising changing the gearbox between the first and second operating configurations by at least one of adding and removing intermediate gears.

12. The method of claim 11, comprising moving at least one support for an intermediate gear within the housing, so that the gear train meshes.

* * * * *